Oct. 11, 1932.                E. L. BLAKE                 1,882,173

FRICTION BRAKE

Filed June 11, 1931

INVENTOR
Earl L. Blake,
BY
Fred P. Gorin
ATTORNEY

Patented Oct. 11, 1932

1,882,173

UNITED STATES PATENT OFFICE

EARL L. BLAKE, OF TACOMA, WASHINGTON

FRICTION BRAKE

Application filed June 11, 1931. Serial No. 543,715.

This invention relates to a brake of the type used on automobiles where a band or lining is frictionally applied to a rotating drum.

The principal object of this invention is to provide a brake in which the band or lining is moved horizontally to engage the drum rather than the usual contracting or expanding operation.

The improved form of brake involves the principle of a cone clutch which offers many advantages over the general type of brake. In the first place, less power is required to set the brake than in present types, doing away with air boosters or hydraulic devices, and giving more clearance between the drum and the brake lining, which gives freedom from dragging. Positive and even tension is placed on the entire brake lining regardless of pressure applied. Periodic adjustment can also be eliminated by a construction which allows sufficient movement so that the entire brake lining may be worn out before adjustment is necessary. In this brake the entire surface is effective, allowing the entire lining to be evenly or uniformly worn out.

In the drawing:—

Figure 2:
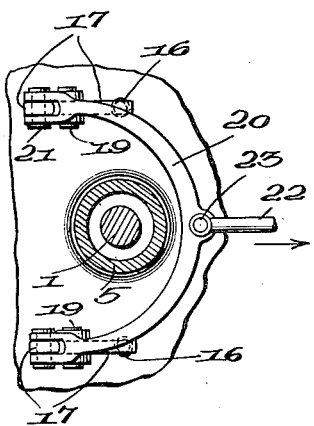
Figure 2 is a fragmentary view upon the line 2—2 of Figure 1.

As particularly shown in the accompanying drawing, an axle 1 rotates a hub 2, said hub being secured to the axle in the usual manner by a nut 3. A disk wheel 4 is shown secured to the hub by bolts 4a and adapted to turn therewith. A housing 5 for the rear axle carries a casting 6 which supports a bearing 7 upon which the axle 1 is journaled.

The hub 2 is continued and bent inward to form a drum portion 8 which rotates with the wheel. Secured to the casting 6 by bolts 10 is a cylindrical drum 9 which carries keys 11 on its outer surface. The keys 11 are designed to interlock drum 9 with a spider 12 which has an outer frusto-conical surface, the outside of which is adapted to interfit with the inside of the bent portion 8 of the hub 2.

Secured to the outside surface of the spider 12 is a lining 13 which engages the bent drum portion 8 of the hub 2, thereby forming a brake. To bring the lining and drum together, it is necessary to move the spider 12 in a horizontal direction. A spring 14 is conventionally shown to provide means for normally holding the lining from contacting with the drum. To force the lining against the drum, rods 15 secured to the spider 12 project inward through the casting 6 at 16 and are pivotally fastened to bell cranks 17 which are pivotally secured to brackets 18 mounted on casting 6. A yoke 20 connects the bell cranks to a rod 22 by pin 23, which in turn connects to the ordinary brake operating lever.

Figure 1:
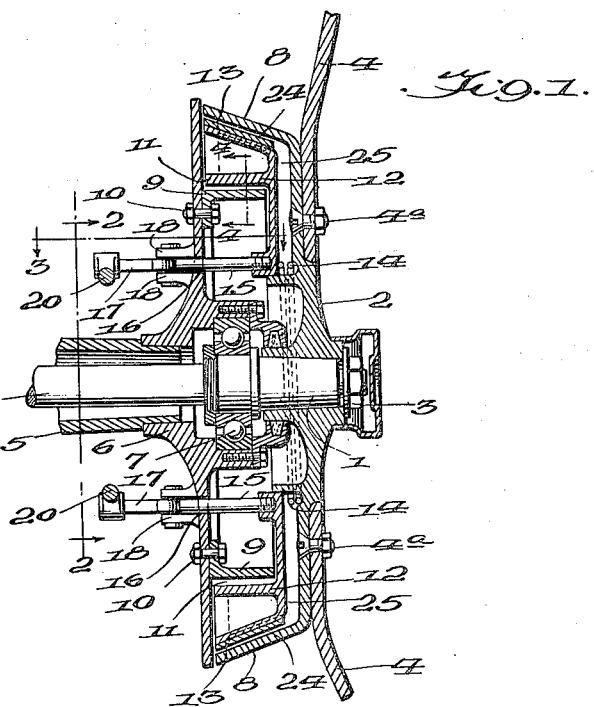
Figure 1 shows a cross section of the brake looking toward the rear.
Figure 4:
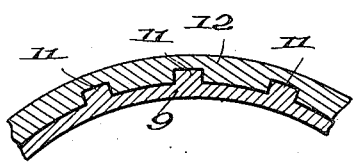
Figure 4 is a fragmentary view upon the line 4—4 of Figure 1.
Figure 3:
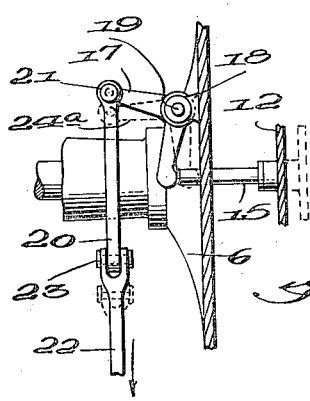
Figure 3 is a fragmentary view upon the line 3—3 of Figure 1.

The method of operation is as follows: When the car is running or the brake otherwise released, the spider 12 is urged to the left by means of spring 14 and occupies the position shown in solid lines in Figures 1 and 3, leaving ample clearance between the brake lining 13 and the drum 8, as shown at 24 in Figure 1. When it is desired to set the brakes, the usual brake lever is operated, pulling the rod 22 in the direction indicated by the arrows in Figures 2 and 3. This rotates the bell crank 17 to the position shown in the dotted line 24a, Figure 3, pressing rod 15 to the right, bringing the brake lining 13 on the spider 12 into contact with the brake drum 8, consequently setting the brake, as shown in dotted lines 25, Figure 1. By proportioning the parts so that considerable space is provided between the hub 2 and the spider 12, it will be seen that the entire brake lining may be worn away before the spider 12 comes in contact with hub 2. Upon releasing the rod 22, the spider 12, with the brake lining 13, is forced away from the brake drum 8, which releases the brake. The spider 12, having no rotating action relative to casting 6, will naturally cause a friction or drag when coming in contact with the brake drum 8, which is rotating with the wheel.

I claim:—

A brake for vehicles including an axle housing, an axle therein, a wheel mounted on the axle, a braking drum carried by the wheel and having a braking surface inclined to the axis of the drum, a supporting drum carried by the axle housing, a spider keyed on the supporting drum for axial movement with respect thereto, the spider having a braking surface for cooperation with the braking surface of the drum, a pair of rods projecting from the spider and through the housing, bell crank levers pivoted on the outside of the housing, one arm of each of the bell crank levers engaging the outer ends of the rods, a yoke pivoted to the free ends of the other arms of the bell crank levers, an operating rod pivoted to the yoke to actuate the bell crank levers and force the braking surfaces into contact, and a spring interposed between the spider and the braking wheel to normally disengage the braking surfaces.

In testimony whereof I affix my signature.

EARL L. BLAKE.